(12) United States Patent
Mizrahi et al.

(10) Patent No.: US 7,807,968 B2
(45) Date of Patent: Oct. 5, 2010

(54) METHOD AND SYSTEM FOR MEASURING AND COMPENSATING FOR THE CASE TEMPERATURE VARIATIONS IN A BOLOMETER BASED SYSTEM

(75) Inventors: Udi Mizrahi, Haifa (IL); Avraham Fraenkel, Haifa (IL); Zvi Kopolovich, Timrat (IL); Amnon Adin, Haifa (IL); Leonid Bikov, Elite (IL)

(73) Assignee: Semi-Conductor Devices—An Elbit Systems—Rafael Parnership, Haifa (IL)

( * ) Notice: Subject to any disclaimer, the term of this patent is extended or adjusted under 35 U.S.C. 154(b) by 132 days.

(21) Appl. No.: 11/886,680

(22) PCT Filed: Jan. 12, 2006

(86) PCT No.: PCT/IL2006/000046

§ 371 (c)(1),
(2), (4) Date: Dec. 15, 2008

(87) PCT Pub. No.: WO2006/100662

PCT Pub. Date: Sep. 28, 2006

(65) Prior Publication Data
US 2009/0212220 A1  Aug. 27, 2009

(30) Foreign Application Priority Data
Mar. 24, 2005 (IL) .................................... 167641

(51) Int. Cl.
*G01J 5/00* (2006.01)
(52) U.S. Cl. ............... 250/338.1; 250/332; 250/339.02; 250/339.04; 250/352
(58) Field of Classification Search ........... 250/332, 250/338.1, 339.02, 339.04, 339.09, 352
See application file for complete search history.

(56) References Cited

U.S. PATENT DOCUMENTS

| 5,600,143 | A | * | 2/1997 | Roberts et al. | ............... | 250/349 |
| 6,141,048 | A | * | 10/2000 | Meyers | ....................... | 348/294 |

(Continued)

FOREIGN PATENT DOCUMENTS

EP    1117250 A2 *  7/2001

*Primary Examiner*—David P Porta
*Assistant Examiner*—Djura Malevic
(74) *Attorney, Agent, or Firm*—Fommer Lawrence & Haug LLP; William S. Frommer (57) ABSTRACT

A focal plan array system of the bolometer type which comprises: (a) an array of i×j pixel detectors of the bolometer type for sensing scenery radiation; (b) a case which accommodates said array of detectors, said case having a front window that provides exposure to the sensing element of all the i×j pixel detectors to radiation coming from the scenery; (c) at least one blind detector of the bolometer type within the case in a column j+1 for sensing case radiation, the sensing elements of said at least one detector are irradiated by one or more reference surfaces whose radiation is proportional to the case radiation; (d) reading circuitry for reading indication for the scenery radiation as sensed by each of the i×j detectors of the array, and for reading indication for the case radiation as sensed by said at least one blind detector; and (e) compensation circuitry for compensating each of said scenery radiation indications of each detector for the effects resulted from the case radiation, based on the case radiation indication as sensed by said at least one blind detector.

7 Claims, 7 Drawing Sheets

U.S. PATENT DOCUMENTS

| | | |
|---|---|---|
| 6,410,916 B1 * | 6/2002 | Jost et al. .................... 250/332 |
| 6,515,285 B1 | 2/2003 | Marshall et al. |
| 6,583,416 B1 | 6/2003 | Villani |
| 2007/0215805 A1 * | 9/2007 | Boie et al. ................ 250/338.1 |
| 2009/0008555 A1 * | 1/2009 | Dupont et al. ........... 250/338.1 |

* cited by examiner

METHOD AND SYSTEM FOR MEASURING AND COMPENSATING FOR THE CASE TEMPERATURE VARIATIONS IN A BOLOMETER BASED SYSTEM

FIELD OF THE INVENTION

The field of the invention relates to devices for sensing light radiation. More particularly, the present invention relates to a method and system for compensating for variations in the case temperature of a bolometer type focal plane array.

BACKGROUND OF THE INVENTION

Bolometers are widely used for sensing low radiation of light, generally in the IR band. In most conventional cases, the bolometers are provided in a form of a focal plan array (FPA), wherein the array comprises a plurality of individual sensing elements (hereinafter also referred to as "pixels" or "pixel detectors"). A significant advantage of the bolometer type sensors is their reduced weight and power consumption, particularly due to the fact that they do not require cryogenic cooling. In addition, they are generally much less expensive in comparison with cooled focal plan arrays. However, the typical sensitivity of bolometer type sensors is significantly lower than of cooled-type sensors. Moreover, as bolometer type sensors are very sensitive to temperature variation, they require special means for stabilizing the temperature of the array (FPA) substrate, and for compensating each individual bolometer for said temperature variations. It should be noted that the case that accommodates the FPA contributes roughly 80% of the IR flux for F/1 optics. Thus, it is of vital importance to monitor the case temperature or its radiation.

Vox (Vanadium Oxide) resistors are widely used in typical bolometers, as the Vox has a relatively large TCR (temperature coefficient of resistance), and low 1/f noise contribution.

Typical bolometer FPAs are required to detect radiation with a resolution in the order of 50° mK of the scenery temperature. The temperature variations at the bolometer due to the heat variations within the scenery are in the order of 0.01-0.1° mK. It should be noted that in order to sample those temperature variations, it is required to heat the active resistor (the resistor which is exposed to the scenery) of the bolometer by a temperature in the order of few degrees. Said necessity to provide a sensitivity and resolution in the range of at least 40 orders less than the heating of the active bolometer resistor enforces the use of a differential measurement. The most common and simple circuitry that applies differential measurement is the Wheatstone bridge, and a circuitry which includes Wheatstone bridge is indeed commonly used in bolometer-type FPAs.

However, even though a Wheatstone bridge which performs a differential measurement is applied, the uncooled bolometer-type FPAs mentioned in the prior art are still very sensitive to variations in the ambient temperature, and special compensation circuitry is required for compensating in the FPA pixel level. More particularly, special circuitry is required to compensate for the non-uniformity of the detectors (i.e., to compensate for their different offset and gain), and to further compensate for the non-uniform effect of the change of the case temperature on each detector. The said latter non-uniformity arises from the fact that each detector has a different relative location with respect to the case walls.

In order to account for the non-uniformity of the FPA pixel detectors, prior art bolometer-type FPA manufacturers, or the users themselves commonly perform pre-measurements which determine the gain and offset of each pixel detector. The measurements are performed for constant, predefined ambient (case) and substrate temperatures. The results of the measurements are provided in two matrices (or look up tables), a gain non-uniformity matrix, and an offset non-uniformity matrix. More particularly, by using said two matrices the gain and offset of each pixel detector are adjusted during the actual use of the FPA. It should be noted that the offset matrix is also updated periodically (for example, every 2-3 minutes) at times when a shutter is closed and masks the FPA from scenery radiation. Of course, the FPA cannot be used during the times in which the shutter is closed and the offset matrix update is performed. Said procedure of correction is generally referred to as NUC (Non-Uniformity Correction).

As said, variations in the ambient (case) temperature affect differently each pixel detector, according to the difference of exposure of each pixel detector to the radiation from the case walls. For example, the detectors that are close to the edges of the FPA, and therefore closer to the case walls are more vulnerable to variations in the case temperature than those that are located at the center of the FPA (and therefore farther from the case walls). Therefore, in order to account for said non-uniformity of exposure to the case walls, prior art bolometer-type FPA manufacturers or the users themselves perform also pre-measurement of the response of each pixel detector to variations in the ambient (case) temperature. These latter measurements depict the readout variation of each pixel detector to different case temperatures (while the scenery radiation and the substrate temperature are kept constant). Said latter measurements result in a third, case temperature matrix. During the actual use of the FPA, an additional compensation circuitry performs actual measurement of the case temperature, and using said case temperature matrix, the circuitry provides further compensation in the pixel level to the readout in order to correct its variations evolving from changes in the ambient (case) temperature.

The measurement of the case temperature during said tests for obtaining said third matrix, as well as the actual measurement of the temperature case in order to compensate for the temperature variations during the actual use of the FPA, use temperature sensors that are externally attached to the case. However, the numerous FPA pixel detectors are sensitive to variations of the IR radiation from the case walls, a radiation which is only indirectly correlated to the variations of the case temperature (as measured by said external temperature sensors). Said indirect correlation results in inaccuracies in the compensation that the compensation circuitry provides. Some prior art circuitries apply additional transformation means for transforming said temperature matrix data to a radiation data matrix in order to account for the said indirection of measurement.

It is an object of the present invention to provide means for performing direct pre-measurements and direct pre-determinations of the effects of various levels of IR case radiation on each pixel detector of the FPA.

It is another object of the present invention to provide means for directly measuring the radiation within the FPA case.

It is still another object of the present invention to provide circuitry means for using said radiation measurement, together with said pre-measurement results to compensate each readout value of each pixel detector for the effects due to case radiations.

Other objects and advantages of the present invention will become apparent as the description proceeds.

SUMMARY OF THE INVENTION

The present invention relates to a focal plan array system of the bolometer type which comprises: (a) an array of i×j pixel detectors of the bolometer type for sensing scenery radiation; (b) a case which accommodates said array of detectors, said case having a front window that provides exposure to the sensing element of all the i×j pixel detectors to radiation coming from the scenery; (c) at least one blind detector of the bolometer type within the case in a column j+1 for sensing case radiation, the sensing elements of said at least one detector are irradiated by one or more reference surfaces whose radiation is proportional to the case radiation; (d) reading circuitry for reading indication for the scenery radiation as sensed by each of the i×j detectors of the array, and for reading indication for the case radiation as sensed by said at least one blind detector; and (e) compensation circuitry for compensating each of said scenery radiation indications of each detector for the effects resulted from the case radiation, based on the case radiation indication as sensed by said at least one blind detector.

Preferably, all the focal plan array detectors, and the at least one blind detector perform differential measurement of radiation.

Preferably, each of the detectors has a structure of a Wheatstone bridge type.

Preferably, each of the i×j Wheatstone bridge type detectors has two branches as follows: (a) a first branch comprising a first resistor $R_m$ which is thermally shorted to a substrate which supports the array and is common to all the decoders of the array and a second resistor $R_r$ common to all of the decoders within same row, and which is irradiated by one of said reference surfaces; and (b) a second branch comprising a third resistor $R_c$ which is thermally shorted to the said supporting substrate and which is common to all of the decoders within each of the columns j and a fourth resistor $R_p$ which is unique for each decoder and which is exposed to the scenery.

Preferably, each of the blind Wheatstone bridge type detectors has two branches as follows: (a) a first branch comprising a first resistor $R_{m(j+1)}$ which is thermally shorted to a substrate which supports the array and is common to all the decoders of the array and a second resistor $R_{r(j+1)}$ common to all of the decoders within same row and which is irradiated by one of said reference surfaces; and (b) a second branch comprising a third resistor $R_{c(j+1)}$ which is thermally shorted to the said supporting substrate and which is common to all of the decoders within each of the columns j and a fourth resistor $R_{p(j+1)}$ which is unique for each blind decoder, thermally isolated from the substrate, and which is also irradiated by said reference surface, said fourth resistor $R_{p(j+1)}$ has a different sensitivity to radiation than of the other resistors within the same bridge.

Preferably, the reading circuitry comprises a row selector for selecting at each time a row of the array, and j+1 column amplifiers for correspondingly receiving and amplifying the sensed radiation by each of the decoders within the selected row.

Preferably, the compensating circuitry performs the following expression in order to obtain a decoder signal which is compensated for the case radiation:

$$V_{i,j}(\text{corrected}) = G_{i,j} * (V_{i,j} - xCO_{i,j}) + O_{i,j} \quad (2)$$

Wherein:

$V_{i,j}$—is a pixel detector signal after an A/D conversion;

$G_{i,j}$—is a gain correction matrix extracted by a pre-measurement procedure;

$O_{i,j}$—is an offset correction matrix extracted by a pre-measurement procedure or by measurement at a time of shutter closure;

$CO_{i,j}$ is a case offset array as obtained by the pre-measurements procedure using said blind detectors;

x—is the average signal of all the blind detectors within column j+1 as obtained during operation of the array.

Preferably, said reference surface is the case wall.

Preferably, said reference surface is a surface which is extended from the case wall.

Preferably, said reference surface is thermally coupled to the case wall.

Preferably, said reference surface radiation is the same as the case wall radiation.

DETAILED DESCRIPTION OF PREFERRED EMBODIMENTS

Figure 1:
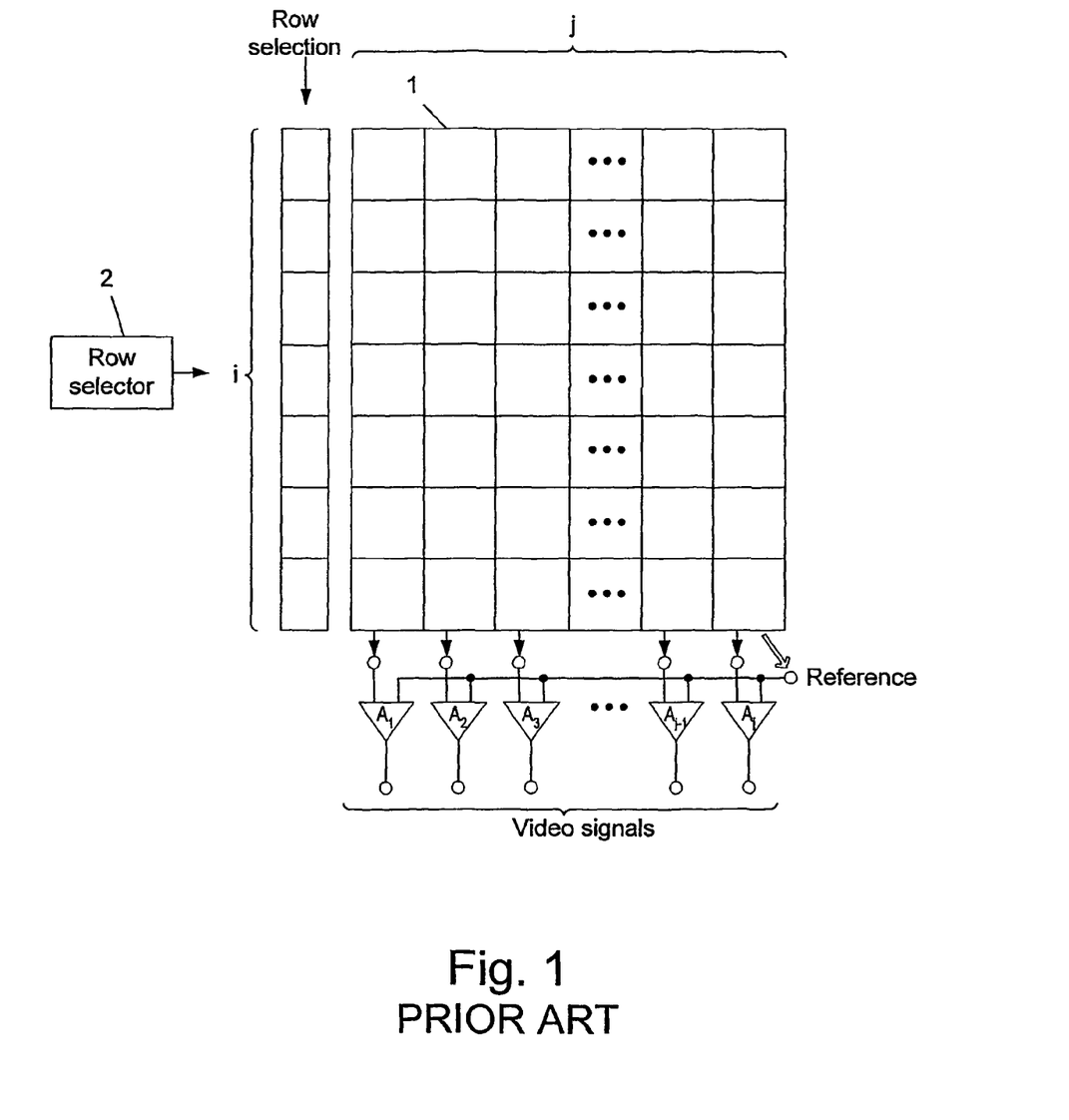
FIG. 1 shows the general structure of a typical, prior art FPA of the bolometer type.

The general structure of a typical FPA 1 of the bolometer type is shown in FIG. 1. The FPA 1 has i rows and j columns, therefore comprising i×j bolometer-type pixel detectors. The readout from the FPA is performed by selecting a full row of pixel detectors by means of row selector 2. When a row is selected, all the detectors of the selected row are simultaneously sensed, and the readouts from all the pixel detectors of the selected row are provided into the inputs of corresponding j column amplifiers $A_1$-$A_j$. As will be elaborated hereinafter, when a row is selected, the reference signal is common to all the column amplifiers.

Figure 2:
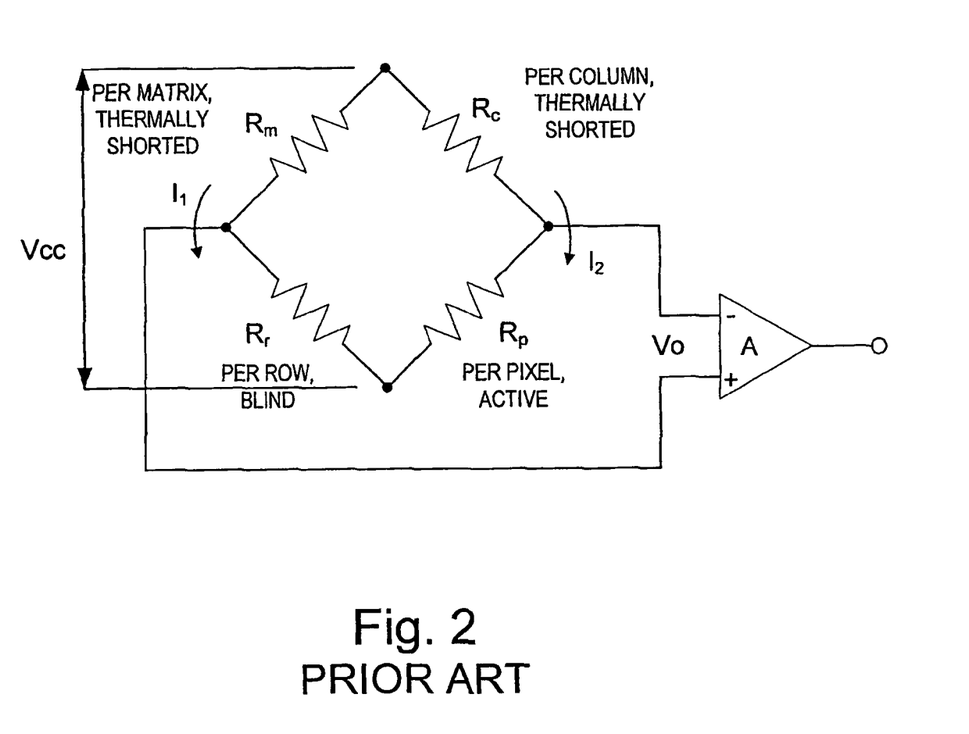
FIG. 2 shows the general structure of one of the i×j pixel detectors of the FPA of FIG. 1.

FIG. 2 shows the general structure of one of said i×j pixel detectors of the FPA of FIG. 1. As shown, all resistors of the detector are arranged in a form of Wheatstone bridge, which provides a differential measurement. The resistor $R_p$ is the "active" resistor which is specific to each pixel detector. All the resistors $R_p$ are thermally isolated and are exposed to the scenery. The resistor $R_r$ is a resistor which is common to all the pixel detectors of each row, and which is referred to herein as a "blind" resistor, as it is totally masked from the scenery. Resistor $R_m$ is one resistor which is common to all the pixel detectors of the FPA, said resistor $R_m$ is thermally shorted to the substrate of the FPA. Resistor $R_c$ is one resistor per column, which is common to all the pixel detectors within each column, and which is also thermally shorted to the substrate. Therefore, in the exemplary FPA of FIG. 1, there are i×j resistors $R_p$, j resistors $R_c$, i resistors $R_r$, and one resistor $R_m$. All the resistors are preferably of Vox type, and should preferably have as identical properties as possible, more particularly, as identical as possible resistance, same thermal coefficient of resistance (TCR), and same thermal capacitance and resistance. It should be noted that one or more of the resistors $R_p$, $R_c$, $R_r$, and $R_m$ may be made of several resistors that are connected in parallel. Whenever a pixel is selected, the differential readout is conveyed into the corresponding column amplifier $A_1$-$A_j$.

It should also be noted that while all the active resistors $R_p$ are constantly irradiated, the readout is streamed out one row at a time, using a single amplifier per column. The "blind" resistor $R_r$ is used for compensating against the dynamic behavior of the active resistor $R_p$. Therefore, it is located at a thermally isolated location which is masked from the scenery radiation. Said resistor $R_r$ is electrically connected only during the readout of the specific row. The other resistors $R_c$ and $R_m$ are connected during the readout of each row. These resistors are thermally shorted to the substrate in order to prevent their destruction due to excessive heating. Thus, when each specific bridge is active, two almost identical branches of current are formed, wherein the currents $I_1$ and $I_2$ cause a differential voltage $V_o$ which is a function of the scenery radiation which is applied over $R_p$.

Figure 7:
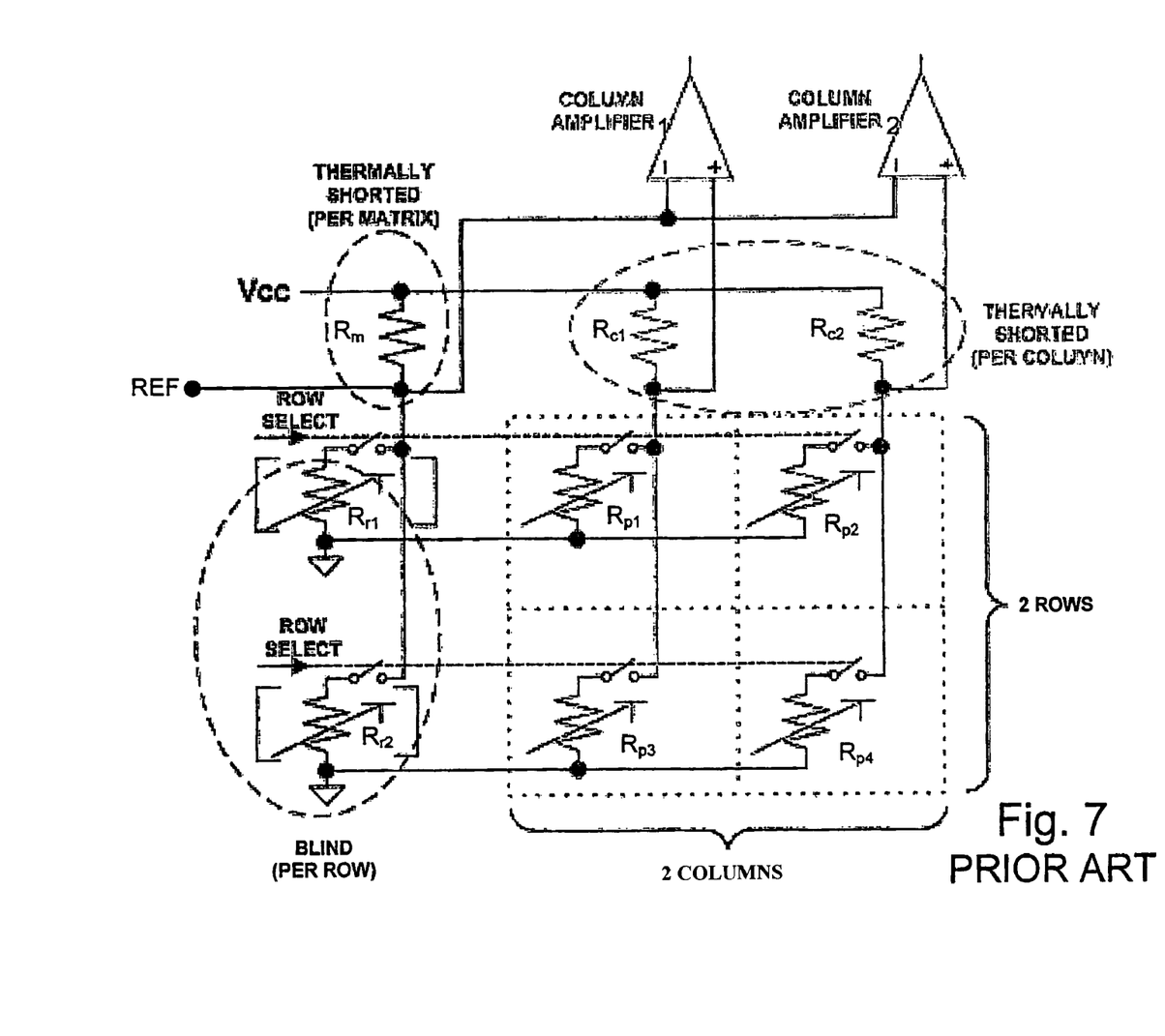
FIG. 7 illustrates the structure of a typical 2×2 pixels FPA according to the prior art.

FIG. 7 illustrates the structure of a typical FPA 1. For the sake of brevity, the FPA is reduced to the size of 2×2 pixel detectors. The row select signals that are produced by the row selector 2, enable the selection of rows in a sequential order. When a row is selected, the voltage over the resistor $R_m$, which is one resistor common to all the FPA pixel detectors, is simultaneously provided to a first of the two inputs of each column amplifier as a reference signal. The voltage over each corresponding resistor $R_p$ within the selected row is provided to the second input of the corresponding amplifier. It can be easily seen that the structure is of a Wheatstone bridge, and therefore the radiation measurement within each detector is differential. The various resistors $R_c$ and $R_r$ complete the bridges.

As said, in order to account for the non-uniformity of the various FPA pixel detectors, prior art bolometer-type FPA manufacturers or the users themselves commonly perform pre-measurements which determine the gain curve and the offset of each pixel detector. The measurements are performed while the ambient (case) and substrate temperatures are kept constant at some pre-defined temperature. The results of the measurements are provided in two matrices (or look up tables), a gain non-uniformity matrix, and an offset non-uniformity matrix. More particularly, during the actual use of the FPA each pixel detector of the FPA is adjusted using the data of said two matrices. It should be noted that the offset matrix is updated periodically (for example, every 2-3 minutes) at times when a shutter is closed and masks the FPA from scenery radiation. Of course, the FPA cannot be used during the times in which the shutter is closed and the update is performed. Said procedure of correction is generally referred to as NUC (Non-Uniformity Correction).

As previously said, the prior art has also provided a procedure for compensating for variations in the case temperature. This procedure is performed in the prior art by means of one or more external temperature sensors, that are attached to the walls of the case. Pre-measurements are made in order to determine the effects of variation of the case temperature on each pixel detector of the array, while the scenery radiation is maintained homogenous and constant, and the substrate temperature is kept constant. The data is kept in a third matrix, and said data is used for compensating each array pixel detector for variations in the case temperature. However, it has been found that this measurement and compensation method which is based on the measurement of temperature, not radiation, is not sufficiently accurate.

Figure 4:
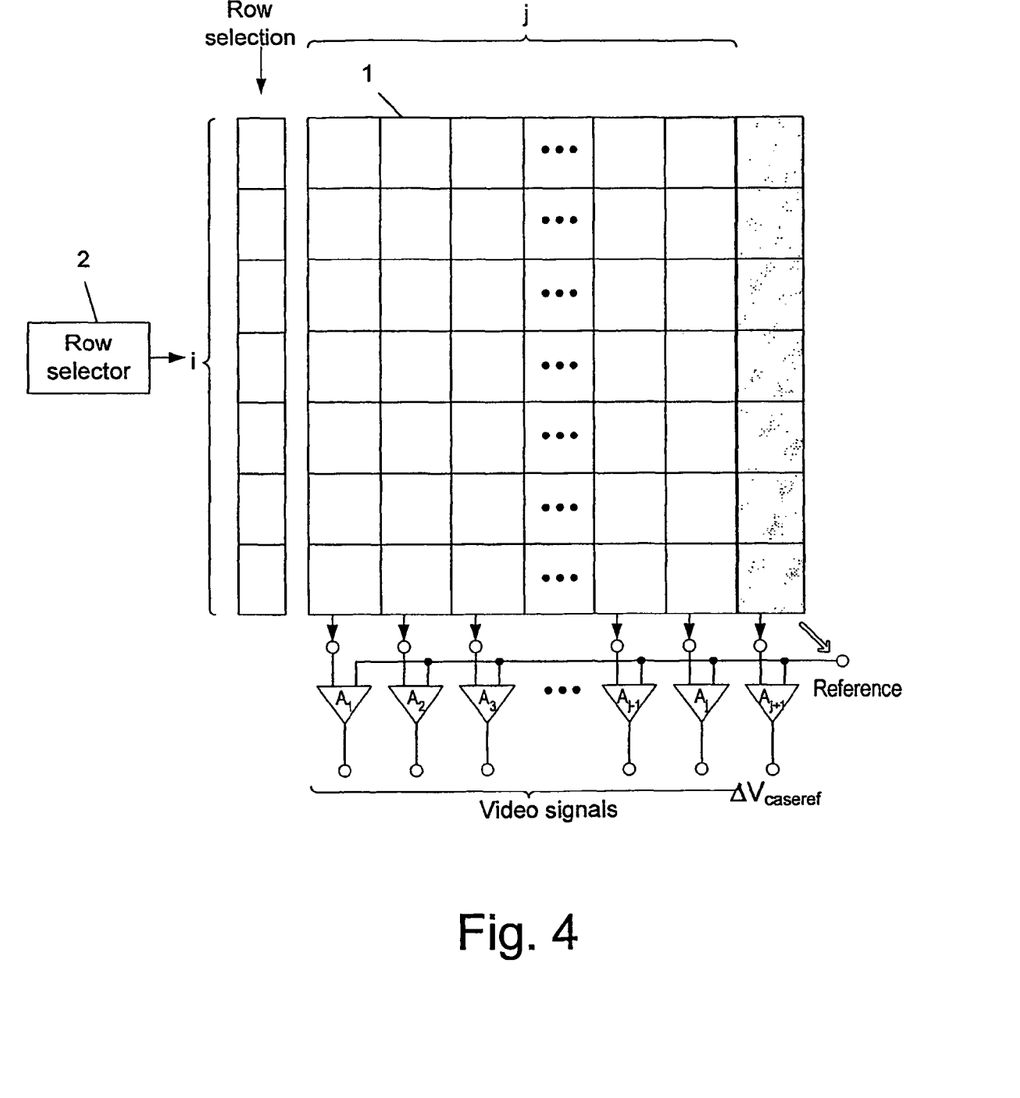
FIG. 4 illustrates the general structure of an FPA according to an embodiment of the present invention.

FIG. 4 illustrates the general structure of the FPA according to the present invention. As shown, the FPA of the present invention comprises an additional column of sensors, indicated as column j+1. Each pixel detector within said additional column has essentially the same structure as the other detectors of the FPA, besides the following two differences:

a. Each "active" resistor $R_{p(j+1)}$ of each detector bridge within the additional column is a "blind" resistor, which is irradiated by a reference surface which is proportional to the case irradiation, in similarity with the "blind" resistor $R_{r(j+1)}$ of the same bridge; and b. The response of the same "active" resistor $R_{p(j+1)}$ of each bridge within column j+1 to radiation is significantly reduced relative to the response of the "blind" resistor $R_{r(j+1)}$. This reduction of response may be obtained, for example, by reducing the absorption efficiency and/or the thermal resistance of the resistor $R_{p(j+1)}$, while maintaining its original dynamic self-heating behavior.

Figure 5:
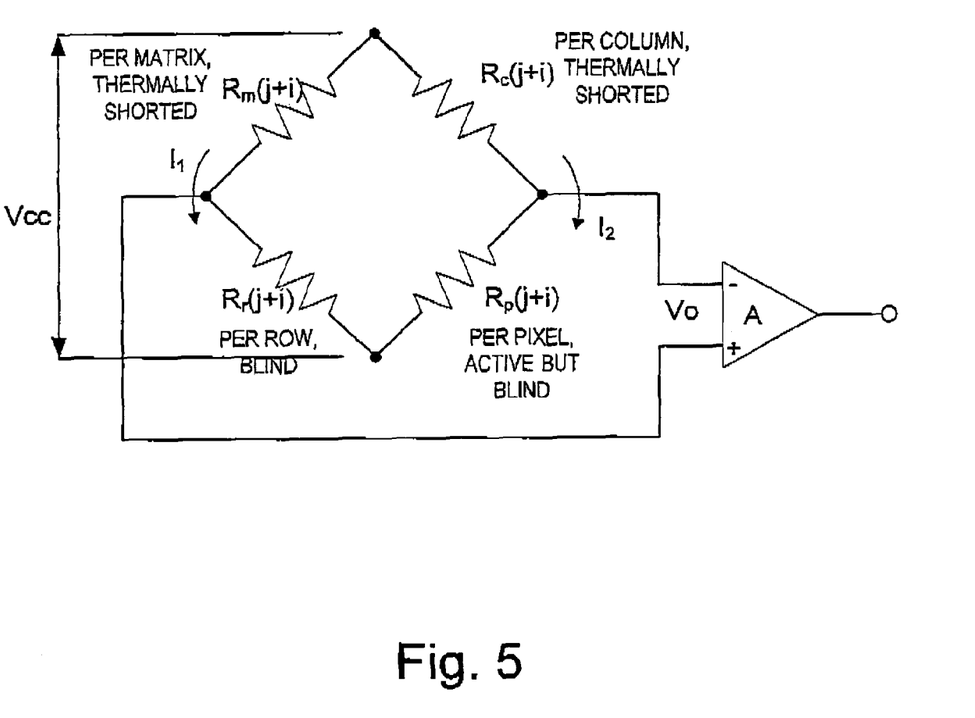
FIG. 5 illustrates the structure of each detector bridge within column j+1 according to an embodiment of the present invention.

The structure of each detector bridge of said column j+1 according to the present invention is shown in FIG. 5. As shown, the bridge comprises two "blind" resistors, a first "blind" resistor $R_{r(j+1)}$ which is common to all the detector bridges within each specific row, and a second "blind" resistor $R_{p(j+1)}$ which as said is an active resistor.

The readout from each detector bridge within column j+1 is performed in a similar manner to the readout from all the other pixel detectors. Whenever a specific row is selected, the readout from pixel detector j+1 is obtained, simultaneously with the readout from all the other detectors 1 to j within said row. However, the fact that the "active" resistor $R_{p(j+1)}$ within column j+1 and within the selected row is irradiated by the reference surface which has a similar temperature & emissivity as the case (or that changes proportionally to the case), causing the readout to be directly proportional to the radiation of the case. This is in contrast to the prior art in which the case temperature is read, not the case radiation, and therefore a complicated transformation is required in order to find the case radiation. It should be noted however that, for the purpose of the present invention, there is no need to include a full column j+1 of detector bridges, as even a single detector bridge according to the present invention in column j+1 can be sufficient. However, for the sake of improving the signal to noise ratio (SNR), and for the sake of uniformity of the array, it has been found that a full column j+1 is preferable. Whenever a full column is used, a readout which is proportional to the case radiation can be obtained in real time and simultaneously with the reading of each row. In many cases there is no need for such a high rate of reading, but the use of a full column j+1 can enable averaging the reading of all the bridges in order to obtain a more accurate indication. As indicated in FIG. 4, the output from the amplifier $A_{j+1}$, referred to herein as $\Delta_{CaseRef}$, is essentially signal that is proportional to the radiation within the case, and is provided in real-time simultaneously with the reading from the pixel detectors that are exposed to the scenery. This characteristic enables the providing of compensation at a real-time frame rate, preventing the serious deterioration of the reading quality of the array detectors as occurred in prior art FPAs between two shutter closures.

Figure 3:
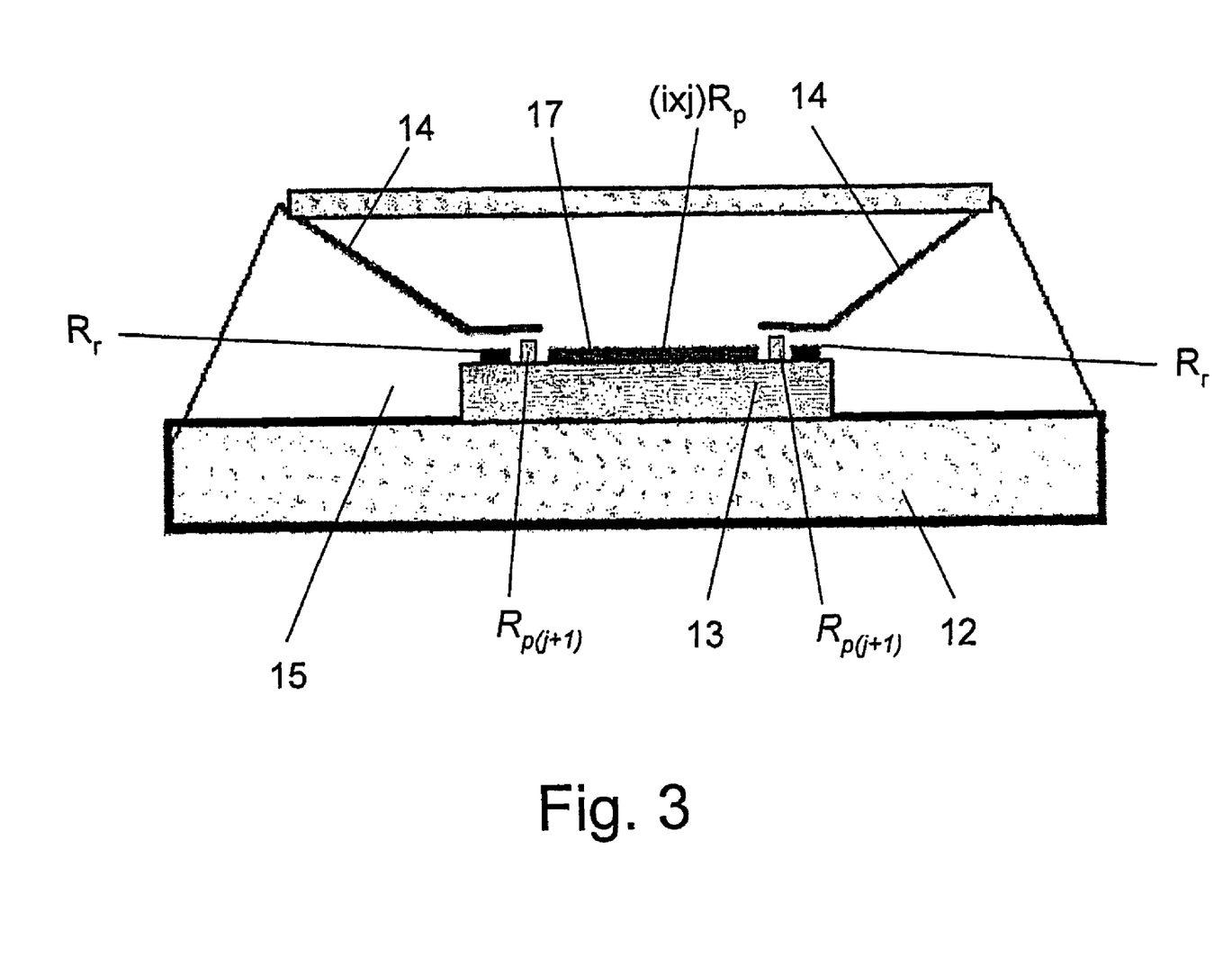
FIG. 3 illustrates the general mechanical structure of a bolometer-type FPA and its case, according to an embodiment of the present invention.

FIG. 3 illustrates the general mechanical structure of a bolometer-type FPA and its case, according to an embodiment of the present invention. The outer walls 12 of the case are made from a thermally conducting material and serve as a heat sink for the substrate 13 and for the thermally shorted resistors $R_m$ and $R_c$ (not shown in FIG. 3). The FPA is indicated as numeral 17, and it comprises at least the plurality (ixj) of the active pixel resistors $R_p$, and the plurality of "blind" resistors $R_r$ that are all thermally isolated from the substrate. A transparent window 15 is provided above the FPA for allowing the radiation from the scenery to impinge on the active resistors $R_p$. The i blind resistors $R_r$ are spread adjacent the active resistors $R_p$ and are shielded from the scenery by means of one or more reference surfaces 14, that are thermally connected or thermally coupled to the case walls 12, or that reflect radiation proportional to the case walls. As shown, the resistors $R_p(j+1)$ are irradiated by same reference surfaces 14. It should be noted the reference surface may be either an extension from one of the case walls, thermally coupled to a case wall, or a reflecting surface that reflects the case wall radiation.

According to the present invention, pre-measurements for determining the effects of case temperature changes on each active detector of the array are made. As said before, said measurements are made for several predefined case temperatures, while a homogeneous scenery radiation is provided to the array, and while the temperature of the substrate of the array is kept constant. However, while in the prior art the parameter was the temperature of the case, and the dependent variable was a matrix that describes the rate of correction that is needed to correct each detector, in the present invention the parameter is the average readouts from all the detectors in column j+1 and the dependent variable is still a matrix that describes the rate of correction that is needed for compensating each detector due to the non-uniform behavior resulting from the temperature drift of the case. As said before, the non-uniformity of behavior to the case temperature drift results from the difference of the location of each detector with respect to the case walls and the inherent process non-uniformity.

The finding of the calibration parameter per each detector PixelCaseGain is obtained by using the following expression:

$$\text{PixelCaseGain} = \frac{\Delta V_{pixel}/\Delta T_{case}}{\Delta V_{caseref}/\Delta T_{case}} = \Delta V_{pixel}/\Delta V_{caseref} \quad (1)$$

wherein:

PixelCaseGain indicates the change of one specific detector voltage readout with respect to a change in the average voltage readout of column j+1;

$\Delta V_{pixel}$ indicates the change of the voltage readout of a specific active detector;

$\Delta T_{case}$ indicates the change in the case temperature; and $\Delta V_{caseref}$ indicates the average change of all the detectors voltage readout from column j+1;

It should be noted herein that unlike the prior art, PixelCaseGain is independent of $\Delta T_{case}$, and thus a same correction array can be used for a wide range of ambient (and therefore also case) temperatures. The fact that PixelCaseGain represents the ratio between the pixel voltage change and the Caseref voltage change makes PixelCaseGain independent of $\Delta T_{case}$.

Thus, a same correction array can be used for a wide range of ambient temperatures. This is in contrast to the prior art that translates the variation of an external temperature measurement to some voltage offset. Therefore, in the prior art, since the signal follows Plank's Law, the relation used is a higher order polynomial function and therefore several arrays are necessary in order to cover the full range of possible temperatures. Therefore, the method and system of the present invention are much simpler for operation, involving fewer calculations, are more accurate, and also provide saving in the amount of array data handled.

The results of the pre-measurements using the expression (1) provide an indication for the case offset voltage which is needed for compensating each specific pixel detector bridge for the non-uniformity resulted from the effect on each detector of the case temperature drift. The data which is obtained for different levels of $\Delta V_{caseref}$ (which relates to different case temperatures) is saved in a matrix (or look up table) $CO_{i,j}$ (CO stands for "case offset"). The gain correction matrix which is obtained in a conventional pre-measurement manner is indicated by $G_{i,j}$, and the offset correction matrix which is also obtained in a conventional pre-measurement manner is indicated by $O_{i,j}$ matrix.

The correction circuitry of the present invention performs the following expression in order to correct the pixel detectors readout:

$$V_{i,j}(\text{corrected}) = G_{i,j}*(V_{i,j} - xCO_{i,j}) + O_{i,j} \quad (2)$$

Wherein:

$V_{i,j}$—is the row pixel detector signal after an A/D conversion;

$G_{i,j}$—is the gain correction matrix extracted by the pre-measurement procedure;

$O_{i,j}$—is the offset correction matrix extracted by the pre-measurement procedure or shutter activation;

$CO_{i,j}$ is the case offset array as obtained by the pre-measurements procedure;

x—is the average coefficient of $V_{caseref}$ as obtained from preferably full column j+1 of pixel detectors (it should be noted that x may be obtained from less than the full column, in some cases even from a single pixel detector within column j+1.

It should be noted again, that there are three matrices of coefficients, $G_{i,j}$, $O_{i,j}$, and $CO_{i,j}$.

Figure 6:
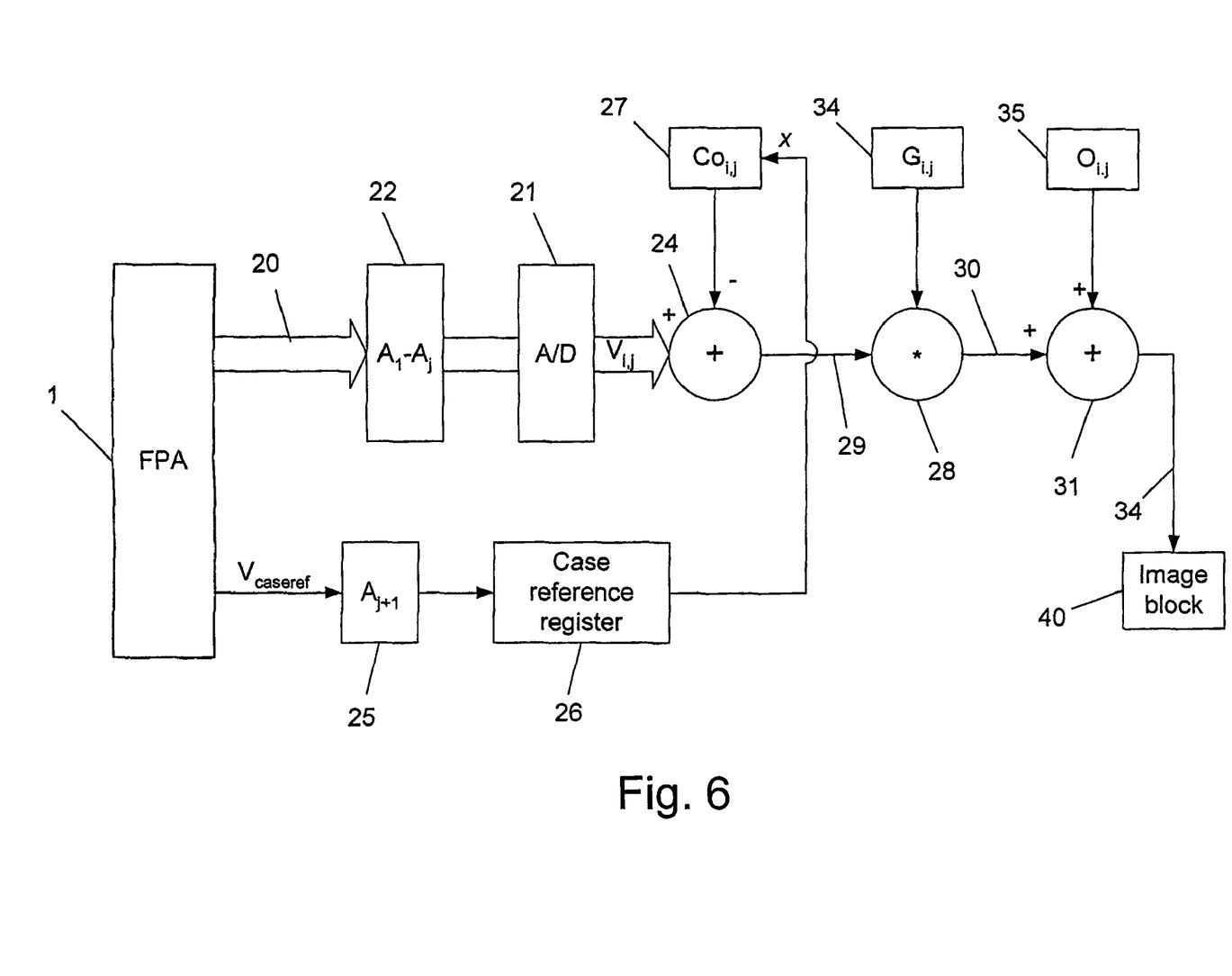
FIG. 6 shows in block diagram form a system for providing compensation in the pixel level for the gain, offset, and case temperature drift.

FIG. 6 shows in block diagram form a system for providing compensation in the pixel level for the gain, offset, and case temperature drift. The system of FIG. 6 performs the expression (2) above. The FPA is indicated by numeral 1. Bus 20 transfers the differential reading of a full row of detector bridges (pixels 1 to j within the selected row to the amplifiers $A_1$-$A_j$ (block 22). A/D converter 21 transforms the amplified reading to digital data, which is provided to the positive (+) input of summing unit 24. The differential Vcaseref reading from the j+1 column and the selected row within FPA 1 is provided into amplifier $A_{j+1}$ (block 25). The amplified reading from amplifier $A_{j+1}$ is conveyed into case reference register 26. Register 26 accumulates and averages the readings from the full column j+1 (i.e., during a period of i reading cycles), and produces a multiplication parameter x that is provided to the $CO_{i,j}$ matrix 27. The corresponding multiplied values $xCO_{i,j}$ are correspondingly provided to the negative (−) input of summing unit 24. Summing unit 24 therefore outputs the values $(V_{i,j} - xCO_{i,j})$ on line 29. Said values of line 29 are provided into the multiplication unit 28, which in turn multiplies these values by the gain matrix $G_{i,j}$ (block 34) (as obtained during the pre-measurement procedure), resulting in $G_{i,j}*(V_{i,j} - xCO_{i,j})$. The resulting output 30 from multiplication unit 28 is provided into summing unit 31, which also receives the input from the offset matrix $O_{i,j}$ 35, (which is also obtained during the pre-measurement procedure). Summing unit 31 therefore produces and outputs on line 34 the values $V_{i,j}(\text{corrected})=G_{i,j}*(V_{i,j}-xCO_{i,j})+O_{i,j}$, which essentially form the video signal. The full image is finally produced at block 40.

As shown, the system of FIG. 7 provides compensation for the readings from the FPA in real time, and compensation which directly relates to the radiation from the FPA case.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A bolometer type focal plan array system having means for compensating for the case temperature in a pixel level, the system comprises:
   a) an array of i×j differential measurement pixel detectors of the bolometer type, each comprises a sensing element for sensing scenery radiation;
   b) a case which accommodates said array of detectors, said case having a front window that provides exposure of said sensing elements of all the i×j pixel detectors to radiation coming from the scenery;
   c) a case offset correction matrix $CO_{ij}$ which comprises i×j pre-measurement values for discretely compensating each sensed output signal from each of said i×j pixel detectors respectively;
   d) at least one differential measurement blind detector of the bolometer type within the case in a column j+1 for sensing case radiation, each sensing element of said at least one blind detector is masked from the scenery and is irradiated by a baffle which extends from the case to close proximity with said sensing element of said at least one blind detector, and whose radiation is proportional to the case radiation;
   e) reading circuitry for reading indication for the scenery radiation as sensed by each of the i×j detectors of the array, and for reading indication for the case radiation as sensed by said at least one blind detector; and
   f) a case-temperature compensation circuitry for multiplying a signal as read from said at least one blind detector by each of the values of said case offset correction matrix, thereby to obtain plurality of case compensation values, each relating to each pixel, and compensation accordingly each of said scenery radiation indications of each detector by the corresponding result of said multiplication.

2. A focal plan array system according to claim 1, wherein each of the i×j detectors and each of the blind detectors has a structure of a Wheatstone bridge type.

3. A focal plan array system according to claim 2, wherein each of the i×j Wheatstone bridge type detectors has two branches as follows:
   a) a first branch comprising a first resistor $R_m$ which is thermally shorted to a substrate which supports the array and is common to all the decoders of the array and a second resistor $R_r$ common to all the decoders within same row, and which is irradiated by one of said reference surfaces; and
   b) a second branch comprising a third resistor Re which is thermally shorted to the said supporting substrate and which is common to all of the decoders within each of the columns j and a fourth resistor $R_p$ which is unique for each decoder and which is exposed to the scenery.

4. A focal plan array system according to claim 2, wherein each of the blind Wheatstone bridge type detectors has two branches as follows:
   a) a first branch comprising a first resistor $R_{m(j+1)}$ which is thermally shorted to a substrate which supports the array and is common to all the decoders of the array and a second resistor $Rr_{(j+1)}$ common to all of the decoders within same row and which is irradiated by one of said reference surfaces; and
   b) a second branch comprising a third resistor $R_{C(J+1)}$ which is thermally shorted to the said supporting substrate and which is common to all of the decoders within each of the columns j+1 and a fourth resistor $R_{p(j+1)}$ which is unique for each blind decoder, thermally isolated from the substrate, and which is also irradiated by said baffle, said fourth resistor $R_{p(j+1)}$ has a different sensitivity to radiation than of the other resistors within the same bridge to form a relatively strong signal in response to variations in the case irradiation.

5. A focal plan array system according to claim 1, wherein the reading circuitry comprises a row selector for selecting at each time a row of the array, and j+1 column amplifiers for correspondingly receiving and amplifying the sensed radiation by each of the decoders within the selected row.

6. System according to claim 1, wherein the compensating circuitry performs the following expression in order to obtain a decoder signal which is compensated for the case radiation:

$$V_{i,j}(\text{corrected})=G_{i,j}*(V_{i,j}-xCO_{i,j})+O_{i,j} \quad (2)$$

$V_{i,j}$—is a pixel detector signal;
$G_{i,j}$—is a gain correction matrix extracted by a pre-measurement procedure;
$O_{i,j}$—is an offset correction matrix extracted by a pre-measurement procedure or by measurement at a time of shutter closure;
$CO_{i,j}$ is a case offset array as obtained by the pre-measurements procedure using said blind detectors;
x—is the average signal of all the blind detectors within column
j+1 as obtained during operation of the array.

7. System according to claim 6, wherein the compensation circuitry operates and provides compensation to the signals read from the array in real time.

* * * * *